United States Patent
Biondo et al.

(10) Patent No.: US 8,499,904 B2
(45) Date of Patent: Aug. 6, 2013

(54) VENTILATED BRAKE DISC

(75) Inventors: Simone Biondo, Milan (IT); Michele Donati, Bergamo (IT)

(73) Assignee: Freni Brembo, S.p.A., Curno, Bergamo (IT)

( * ) Notice: Subject to any disclaimer, the term of this patent is extended or adjusted under 35 U.S.C. 154(b) by 600 days.

(21) Appl. No.: 12/598,248

(22) PCT Filed: Apr. 30, 2008

(86) PCT No.: PCT/IT2008/000296
§ 371 (c)(1),
(2), (4) Date: Apr. 29, 2010

(87) PCT Pub. No.: WO2008/136032
PCT Pub. Date: Nov. 13, 2008

(65) Prior Publication Data
US 2010/0230221 A1  Sep. 16, 2010

(30) Foreign Application Priority Data
May 3, 2007  (IT) ............................. MI2007A0881

(51) Int. Cl.
*F16D 65/12*  (2006.01)
(52) U.S. Cl.
USPC .................................................. 188/218 XL

(58) Field of Classification Search
USPC ........................................ 188/218 XL, 18 R
See application file for complete search history.

(56) References Cited

U.S. PATENT DOCUMENTS

| 5,161,652 | A | * | 11/1992 | Suzuki ................... 188/218 XL |
| 5,427,212 | A | * | 6/1995 | Shimazu et al. ......... 188/218 XL |
| 6,152,270 | A | * | 11/2000 | Giorgetti ................ 188/218 XL |
| 2004/0188196 | A1 | | 9/2004 | Gavin |
| 2006/0243546 | A1 | * | 11/2006 | Oberti et al. ............ 188/218 XL |
| 2007/0246314 | A1 | * | 10/2007 | Schorn et al. ........... 188/218 XL |

FOREIGN PATENT DOCUMENTS

| DE | 4323782 | 1/1994 |
| JP | 04056933 | 5/1992 |
| WO | 02/073060 | 9/2002 |
| WO | 2008/135876 | 11/2008 |

* cited by examiner

*Primary Examiner* — Anna Momper
(74) *Attorney, Agent, or Firm* — Shoemaker and Mattare

(57) ABSTRACT

The invention relates to a brake disc (1) comprising a support cap (2), which is intended to be connected to a wheel hub of a vehicle, and a braking band (3), which is intended to cooperate with a caliper of the disc brake. The braking band comprises two plates (31, 32) which are connected by a plurality of connecting members (33) that define ventilation ducts (34). The brake disc is characterized in that, a plurality of the connecting members having different shapes and/or dimensions are arranged according to a module (M) which repeats itself an integral number of times along the braking band.

9 Claims, 7 Drawing Sheets

VENTILATED BRAKE DISC

BACKGROUND OF INVENTION

The object of the present invention is a disc brake for vehicles, particularly motor vehicles.

Brakes in general, and disc brakes in particular, are able to slow down and/or stop the vehicle by converting the kinetic energy thereof into thermal energy by means of friction phenomena between disc and pads. For this reason, in order to maintain the efficacy of the same brakes, it is important that disc and pads are not overheated. Therefore, it is important to achieve an efficient dispersion of heat in the environment.

In this regard, brake discs are known to comprise a pair of plates being put in a side-by-side relationship which, in turn, comprise outer friction surfaces and inner ventilation ducts.

The plates are typically mutually coupled by connecting members, which can be pillars or tongues. The shape of such connecting members dictates the shape of the disc ventilation ducts.

Such discs are not free from drawbacks, while being widely appreciated.

In fact, it has been noted that the venting of the disc which is obtained with the duct of the known type is not optimized, and that the resulting dispersion of heat is not entirely efficient.

SUMMARY OF INVENTION

The object of the present invention is to devise and provide a brake disc which allows at least partially obviating the drawbacks cited herein-above with reference to the prior art.

Particularly, the task of the present invention is to provide a brake disc comprising ventilation ducts which allow an optimized venting and a maximally efficient dispersion of heat.

Such object, and such tasks, are achieved by the brake discs in accordance with the annexed independent claims.

BRIEF DESCRIPTION OF DRAWINGS

Further characteristics and the advantages of the brake disc according to the invention will be understood from the description set forth below of preferred exemplary embodiments, given by way of non-limiting example, with reference to the annexed Figures, in which.

DETAILED DESCRIPTION

Figure 2:
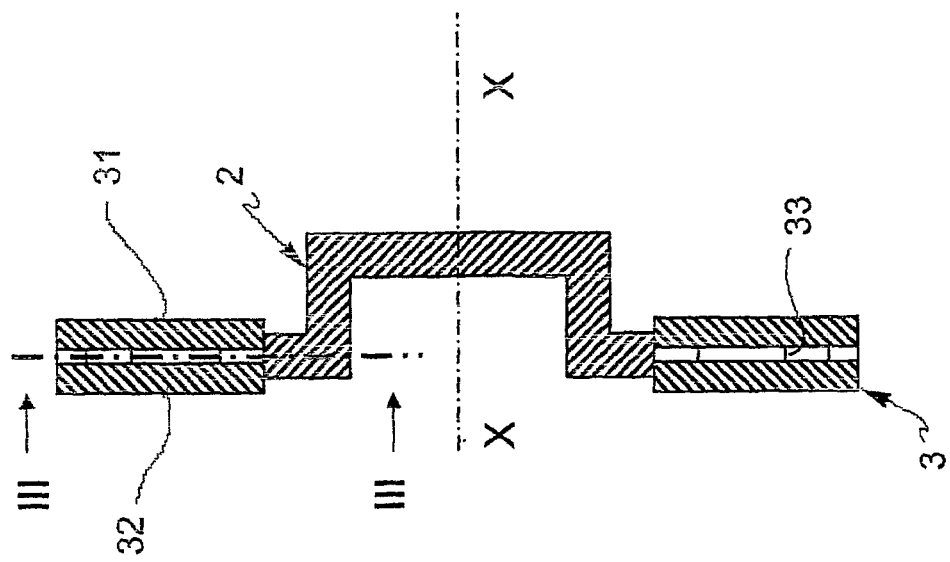
FIG. 2 illustrates a view of the brake disc section along the line indicated with II-II in FIG. 1.
Figure 1:
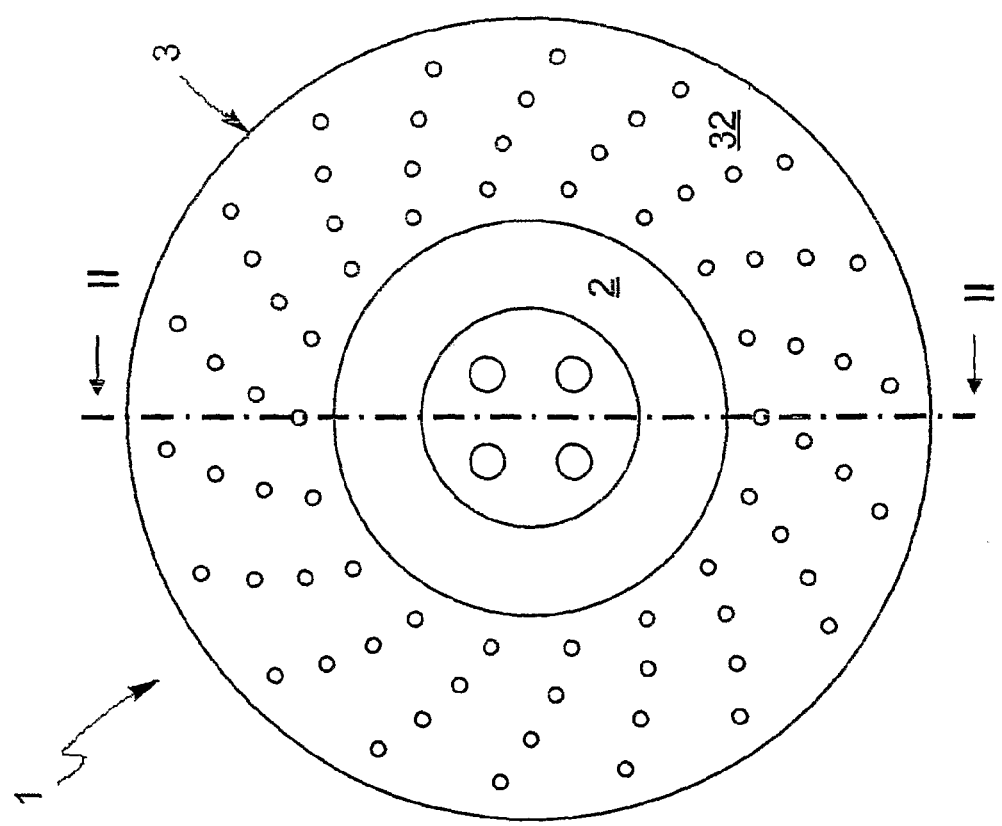
FIG. 1 illustrates an overall axial view of a brake disc according to the invention.

With reference to the above-mentioned Figures, a brake disc according to the invention has been generally designated with 1.

The brake disc 1 according to the invention comprises two parts which share a rotation axis X. A first part, the support cap 2, is intended to be connected to the wheel hub of a vehicle, while the remaining peripheral part, braking band 3, is intended to cooperate with the disc brake calipers in order to exert a braking action on the vehicle.

The braking band 3 is, in a manner known per se, of the ventilated type. The ventilated band comprises two plates 31 and 32 that are connected by a plurality of connecting members 33. The connecting members 33 define ventilation ducts 34 for the cooling air.

In the disc brake according to the present invention, a plurality of connecting members 33 having different shapes and/or dimensions is arranged according to a module M which repeats itself an integral number of times along the braking band 3.

With reference to the brake disc 1, and to the rotation axis X thereof:

"Axial" means any directions parallel to said axis X;

"Radial" means any directions perpendicular to the axis X and incident therewith; and "Circumferential" or "tangential" means the direction of any circumferences centred on said axis X and lying on a plane normal thereto, or the direction of a tangent thereof.

Figure 3:
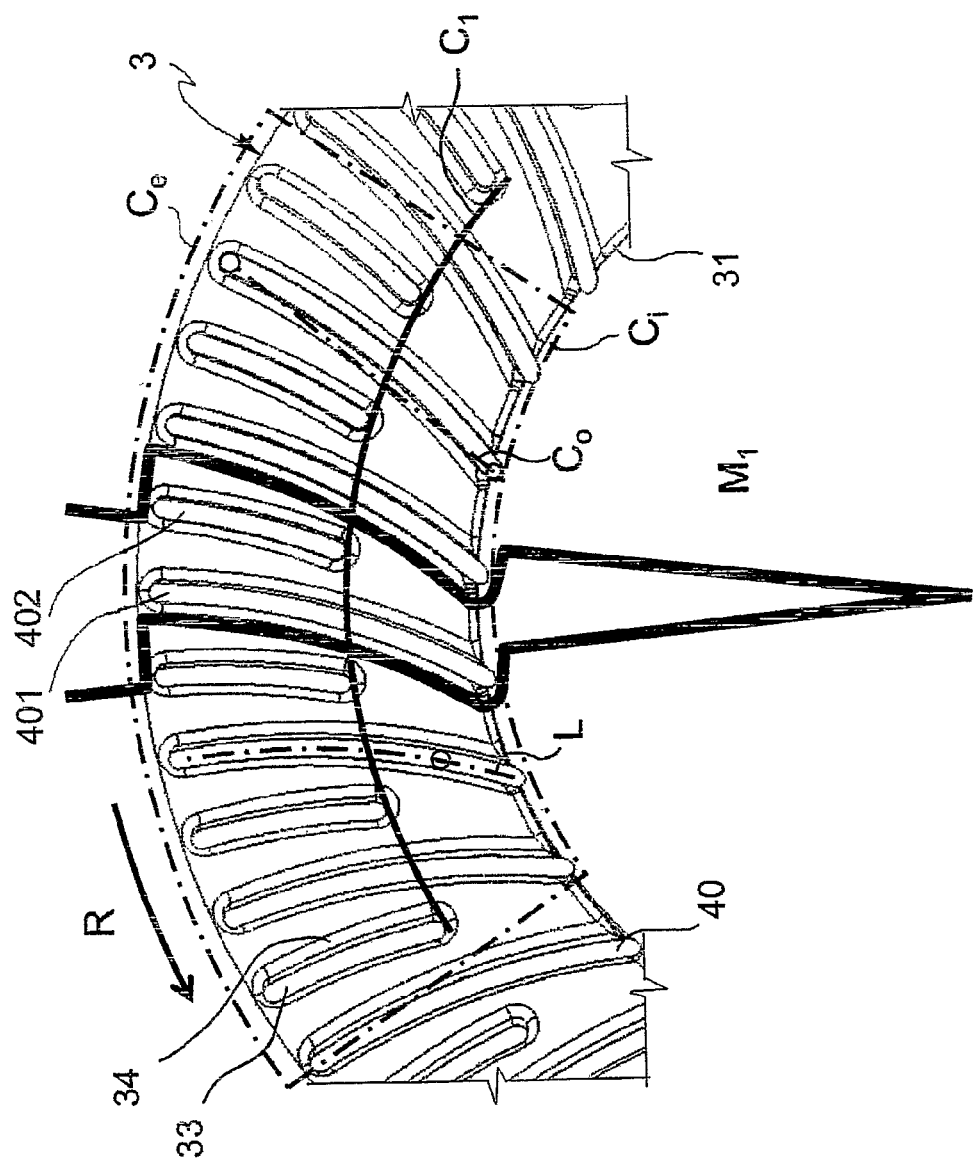
FIG. 3 illustrates a detailed view of the brake disc section along the line III-III of FIG. 2.

The braking band 3, as schematically indicated in FIG. 3, is a circular crown defined by a radially inner circumference $C_i$ and a radially outer circumference $C_e$.

In accordance with the embodiments of FIGS. 3-7, the brake disc 1 connecting members 33 comprise tongues 40.

Herein and after, by the term "tongue" is meant a structure having a thin and enlarged cross-section.

Relatively to the section of a tongue 40 that is provided in the brake disc 1 median plane, for example the one seen in FIG. 3, it is possible to define a median line L. Such median line L can be, for example, defined as the locus of the centres of the circumferences inscribed in the tongue profile. In FIG. 3, only one of such circumferences is represented for clarity along with the median line L.

In accordance with some embodiments, the tongue median line L is curved. The curved median line L can have (see, for example, FIGS. 3 to 6) a concavity that is directed towards the direction R of the disc preferred rotation, or it can have (see, for example, FIG. 7) a concavity that is directed against the direction R of the disc preferred rotation.

Relatively to the section of a tongue 40, it is possible to define also a chord $C_o$. Such chord $C_o$ can for example be defined as the straight line segment which joins the centres of the circumferences inscribed in the profile of the two tongue ends. Such circumferences are represented in FIG. 3 along with chord $C_o$.

The tongues 40 can have different lengths according to specific requirements; in any case, they extend along the median line L by a considerably greater length than they extend transversally thereto. In other terms, there is a big difference between the median line L length and the average diameter of the circumferences inscribed in the tongue profile.

The median line L extends preferably in the radial direction and, often by a lesser extent, in the tangential direction. In other terms, the chord $C_o$ of a tongue preferably forms an angle relative to any radial directions passing through the tongue.

The tongue 40 is connected in a continuous manner to each of the two plates 31 and 32. Preferably, the connection between tongue 40 and plates 31 and 32 is carried out by a radius, well seen in FIG. 5.

The tongues 40 are preferably arranged in arrays along the braking band 3 circular crown.

How it will be appreciated by those skilled in the art, the tongues are configured and arranged in a manner essentially comparable to that of the vanes of a centrifugal turbo machine, in which the fluid flow has a direction which is locally essentially parallel to the vanes median line L.

In accordance with the embodiment of FIG. 3, the tongues 40 are arranged on a single array, and repeat themselves according to a module $M_1$. Such module $M_1$ comprises two tongues having different lengths: a long tongue 401, and a short tongue 402.

Herein and below, a module M is arbitrarily defined, and reference is made to such module in order to facilitate the description of the tongues and the arrangement thereof. It will be appreciated by those skilled in the art that each module M can be defined in a different manner as much arbitrarily, but this does not involve any changes in the characteristics of the tongues and the arrangement thereof.

The long tongue 401 extends from the proximity of the outer circumference $C_e$ to the proximity of the inner circumference $C_i$, while the short tongue 402 extends from the proximity of the outer circumference $C_e$ to an intermediate circumference $C_1$.

It shall be noted from FIG. 3 that such intermediate circumference $C_1$ is arranged in the proximity of the braking band 3 radial half, preferably slightly more inwardly located than the radial half.

The tongues 401 and 402 of the module $M_1$ are curved and have a mutually co-directional concavity, oriented towards the direction R of the disc preferred rotation.

The module $M_1$ of the embodiment in FIG. 3 has a circumferential width of 12°. Consequently, the module $M_1$ repeats itself 30 times in the circumferential direction along the entire braking band 3.

Figure 4:
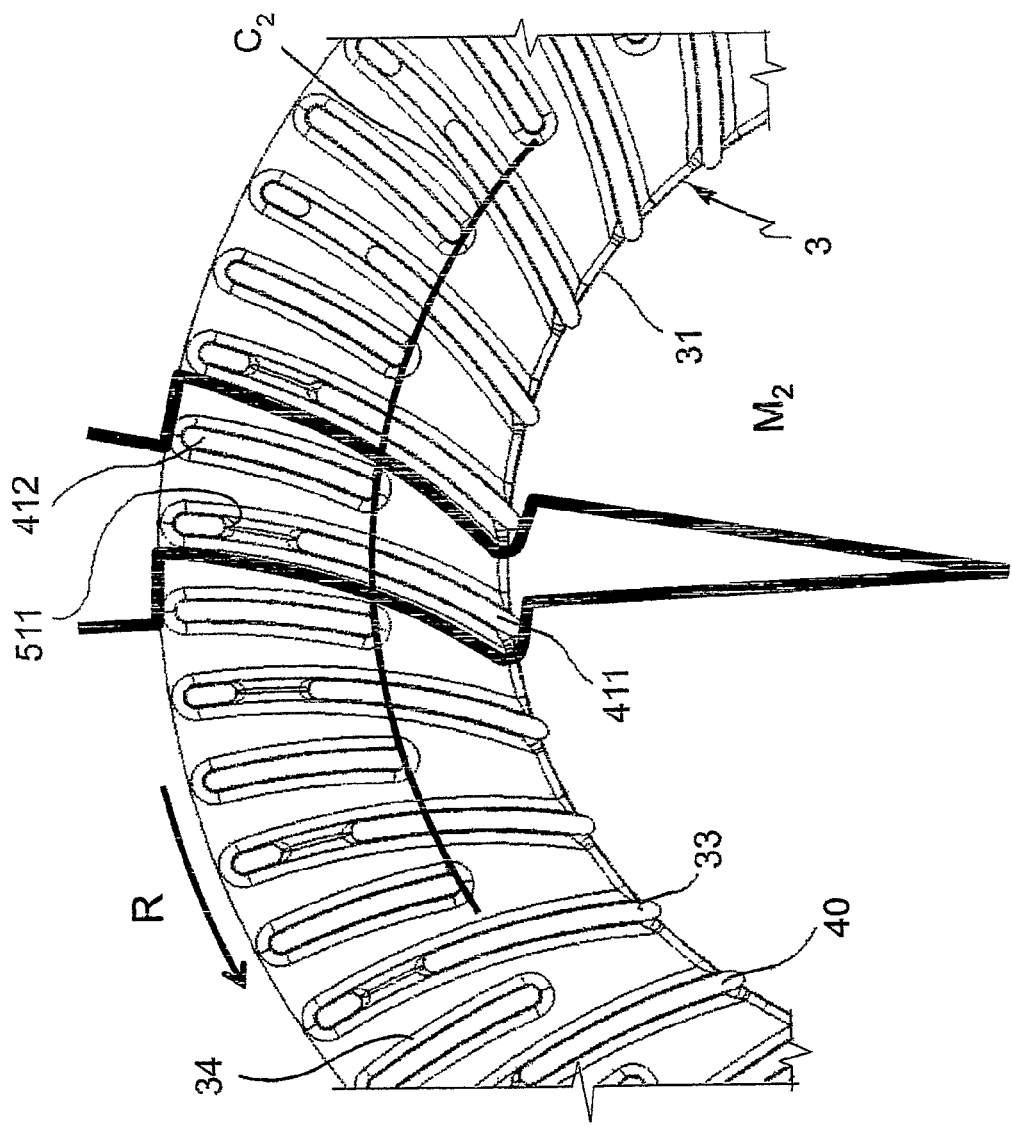
FIG. 4 illustrates a detailed view of a section similar to that in FIG. 3.
Figure 5:
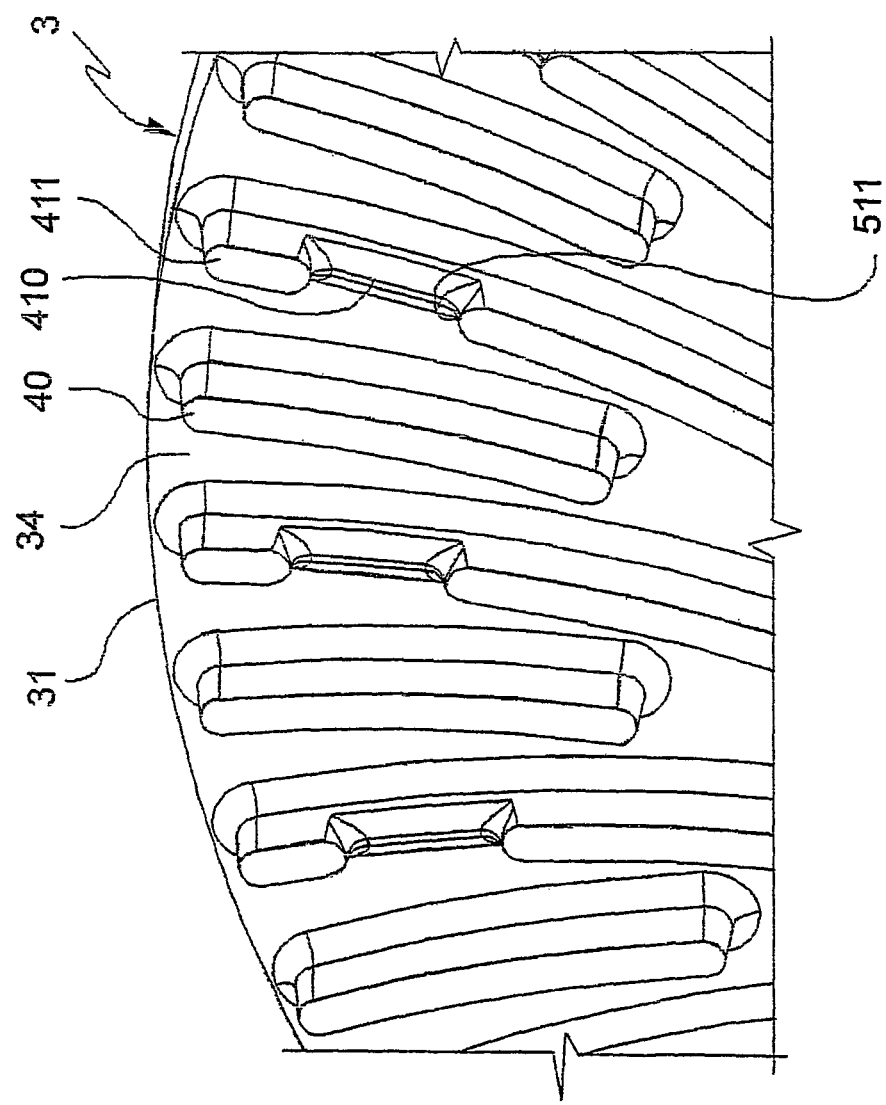
FIG. 5 illustrates a perspective view of the section in FIG. 4.

In accordance with the embodiment of FIG. 4, the tongues 40 are arranged on a single array, and repeat themselves according to a module $M_2$, similar to the module $M_1$ described above. Such module $M_2$ comprises two tongues having different lengths: a long tongue 411, and a short tongue 412.

The long tongue 411 essentially extends from the outer circumference $C_e$ to the inner circumference $C_i$, while the short tongue 412 essentially extends from the outer circumference $C_e$ to an intermediate circumference $C_2$.

It shall be noted from FIG. 4 that such intermediate circumference $C_2$ is located in the proximity of the braking band 3 radial half, preferably located slightly more inwardly than the radial half.

The long tongue 411 comprises a window 511. By the term "window" is meant, herein and below, an opening, provided in the tongue 40, which has lower dimensions than those of the same tongue, particularly axial extension. Therefore, in such embodiment, as it can be clearly seen in FIG. 5, the window 511 entire perimeter is surrounded by a frame 410 composed of tongue 40.

The window 511 is located along the long tongue 411, so as to fully face the short tongue 412.

The module $M_2$ tongues 411 and 412 are curved and have a mutually co-directional concavity, oriented towards the direction R of the disc preferred rotation.

The module $M_2$ of the embodiment of FIG. 4 has a circumferential width of 12°. Consequently, the module $M_2$ repeats itself 30 times in the circumferential direction along the entire braking band 3.

Figure 6:
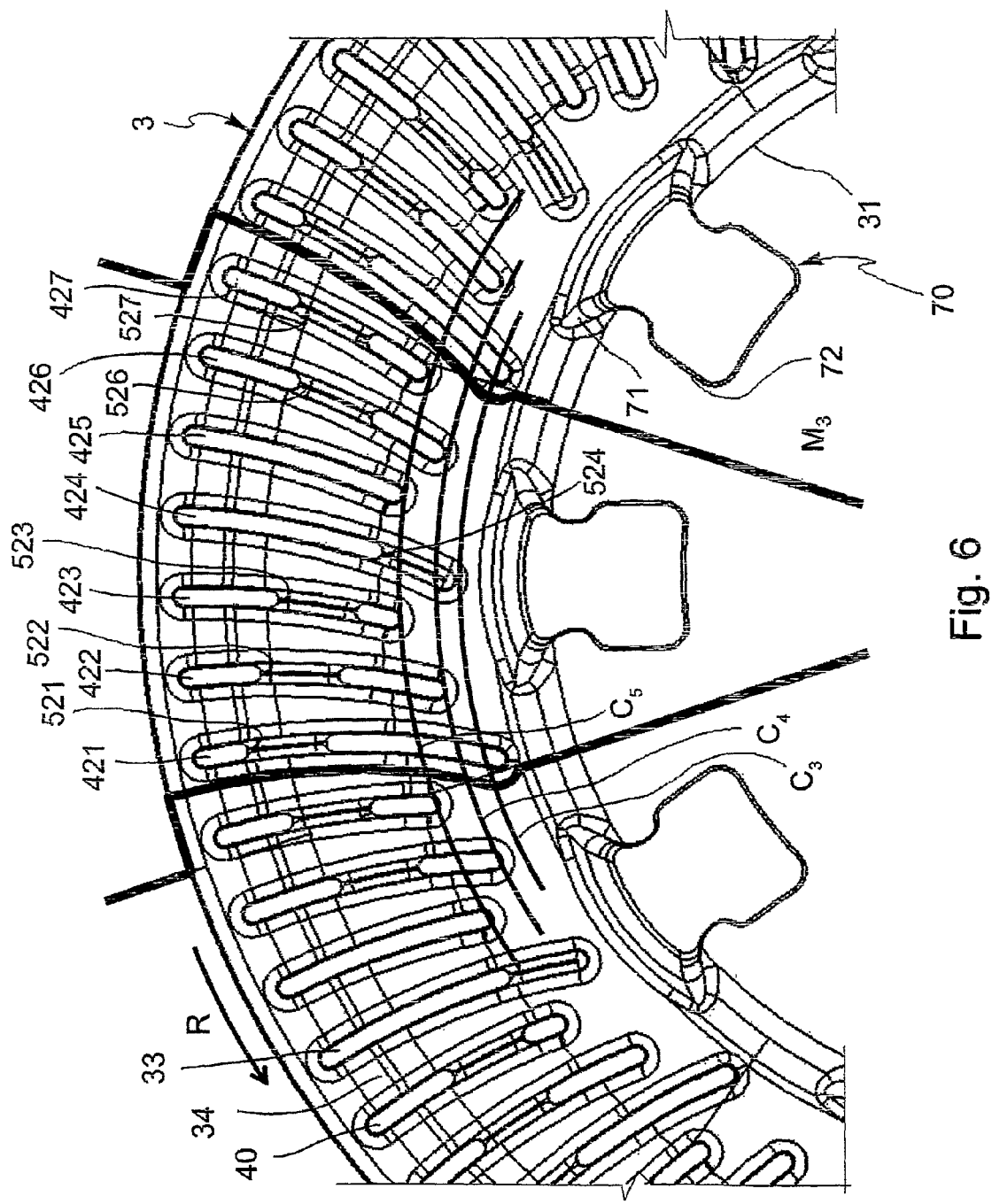
FIG. 6 illustrates a detailed view of a section similar to that in FIG. 3 in another embodiment.

In accordance with the embodiment of FIG. 6, the tongues 40 are arranged on a single array, and repeat themselves according to a module $M_3$. Such module $M_3$ comprises seven tongues having four different lengths. In accordance with the represented embodiment, in the module $M_3$: long tongue 421, medium-short tongue 422, short tongue 423, medium-long tongue 424, short tongue 425, medium-short tongue 426, and short tongue 427 are placed one after the other in the above order.

The long tongue 421 essentially extends from the outer circumference $C_e$ to the inner circumference $C_i$. The successive lesser tongues essentially extend from the outer circumference $C_e$ to other intermediate circumferences. Particularly, the medium-long tongue 424 extends up to a circumference $C_3$ slightly larger than the inner circumference $C_i$; the medium-short tongues 422 and 426 extend up to a circumference $C_4$ slightly larger than $C_3$; and the short tongues 423, 425 and 427 extend up to the circumference $C_5$ slightly larger than $C_4$.

It shall be noted from FIG. 6 that such intermediate circumferences $C_3$, $C_4$, and $C_5$ are located in the braking band 3 radially innermost half.

In accordance with the embodiment represented in FIG. 6, all the tongues of the module $M_3$, with the only exception of the short tongue 425, comprise a window. Particularly, the first tongues of the module $M_3$ comprise windows which take more and more inwardly radially located positions. The long tongue 421 window 521 is the radially outermost one, while the windows 522 and 523 of the medium-short 422, and short 423 tongues are more and more inwardly radially located. Such windows partially overlap one the other in the circumferential direction.

The medium-long tongue 424 window 524 is the radially innermost one; it is located in the proximity of the circumference $C_3$; therefore, it is located in the proximity of the radially innermost end of the same tongue. For this reason, the tongue 424 window 524 is surrounded by a frame 420 only on three sides, while the fourth side is open.

As regards the successive tongues, as stated above, the short tongue 425 does not comprise any windows. The medium-short tongue 426 comprises a window 526 located in a position similar to that of the short tongue 423 window 523. Finally, the short tongue 427 comprises a window 527 located in a position similar to that of the medium-short tongue 422 window 522.

All the tongues of the module $M_3$ are curved and have a co-directional concavity, oriented towards the direction R of the disc preferred rotation.

The module $M_3$ of the embodiment of FIG. 6 has a circumferential width of 36°. Consequently, the module $M_3$ repeats itself 10 times in the circumferential direction along the entire braking band 3.

Figure 7:
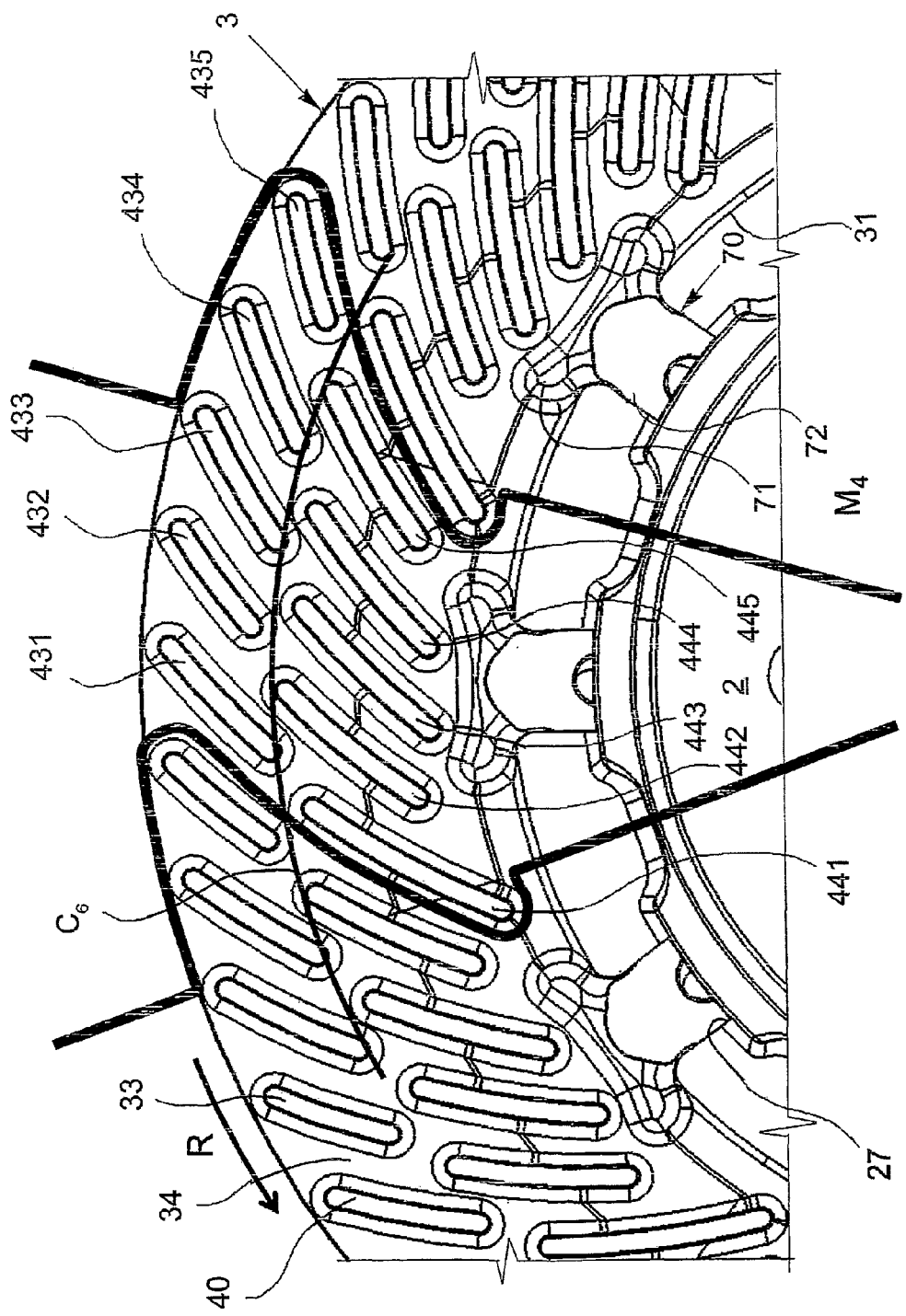
FIG. 7 illustrates a detailed view of a section similar to that in FIG. 3 in a further embodiment.

In accordance with the embodiment of FIG. 7, the tongues 40 are arranged on two arrays, and repeat themselves according to a module. Each array of such module $M_4$ comprises five tongues having two different lengths. In accordance with the represented embodiment, in the radially outer array of the module $M_4$: medium-short tongue 431, short tongue 432, two medium-short tongues 433 and 434, and short tongue 435 are placed one after the other in strict order.

Again, in accordance with the represented embodiment, in the radially inner array of the module $M_4$: long tongue 441, and four medium-long tongues 442, 443, 444, and 445 are placed one after the other in strict order.

The tongues of the radially outer array extend from the outer circumference $C_e$ to the proximity of an intermediate circumference $C_6$. The tongues of the radially inner array extend from the proximity of the intermediate circumference $C_6$ in a radially inner direction. Particularly, the long tongue 441 extends from the proximity of the intermediate circumference $C_6$ to the inner circumference $C_i$.

It shall be noted from FIG. 7 that the intermediate circumference $C_6$ is located in the braking band 3 radially outermost half.

In accordance with the embodiment illustrated in FIG. 7, the tongues of the radially outer array and the tongues of the radially inner array of the module $M_4$ are not mutually aligned. In other terms, the inward extension of the median line L of a tongue belonging to the radially outer array does not overlap any of the median lines of the tongues belonging to the radially inner array.

All the module $M_4$ tongues are curved and have a co-directional concavity, oriented against the direction R of the disc preferred rotation.

The module $M_4$ of the embodiment of FIG. 7 has a circumferential width of 36°. Consequently, the module $M_4$ repeats itself 10 times in the circumferential direction along the entire braking band 3.

Figure 8:
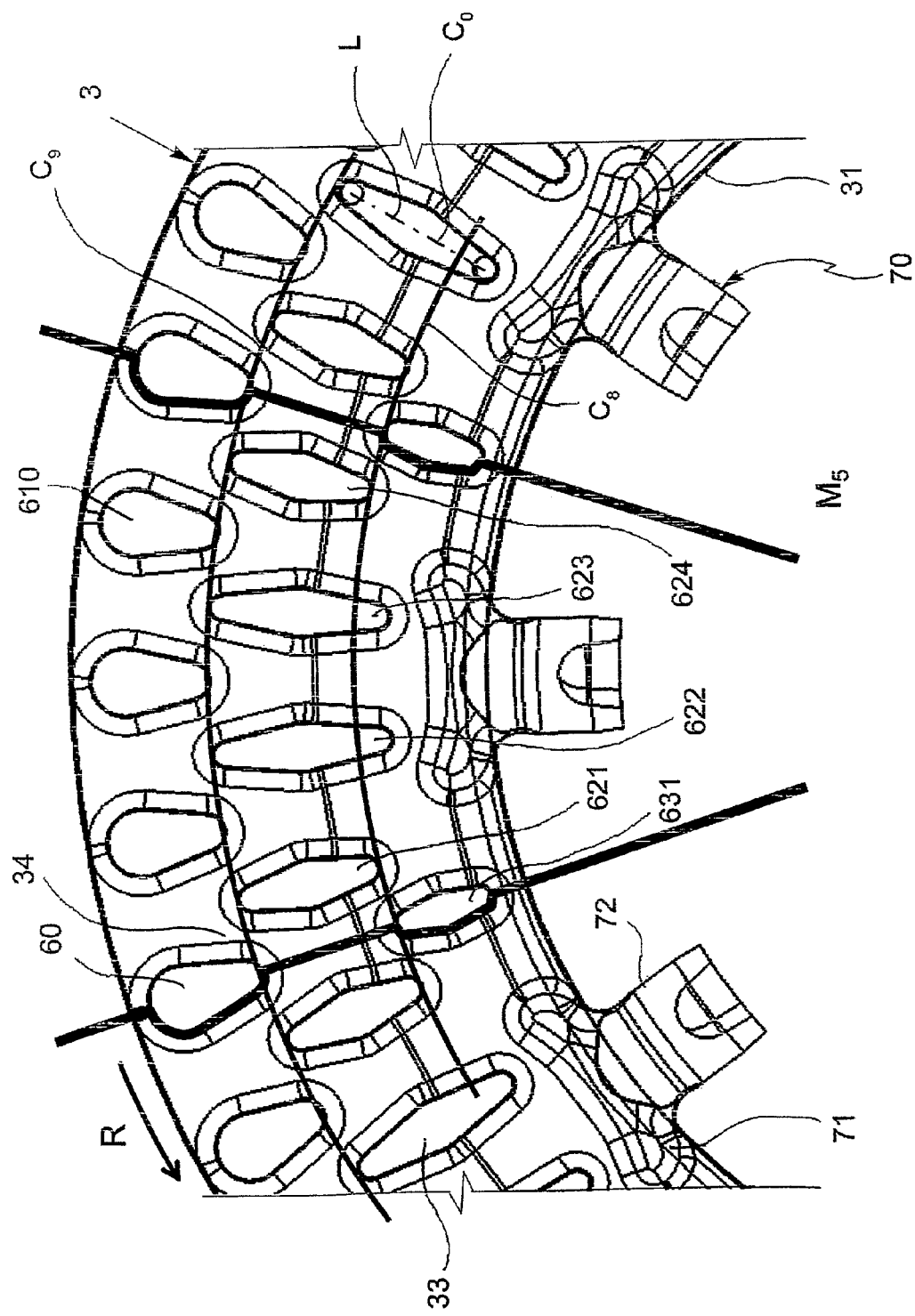
FIG. 8 illustrates a detailed view of a section similar to that in FIG. 3 in a last embodiment.

In accordance with the embodiment of FIG. 8, the connecting members 33 comprise pillars 60. The pillars 60 distinguish themselves from the tongues 40 because they have squatter sections. It is possible to define also for the pillars 60 a median line L similarly to what has been defined before for the tongues 40. Taking into account the pillar extension along the median line L, and the extension transversal thereto, the difference between the two extensions is less strong than it is for a tongue.

Furthermore, in accordance with the represented embodiment, the median line L of each pillar is rectilinear. Therefore, in the case of the pillars represented in FIG. 8, the median line L coincides with the chord $C_o$.

In accordance with the represented embodiment, the pillars 60 are arranged on three arrays, and repeat themselves according to a module $M_5$.

In accordance with the represented embodiment, in the radially inner array of the module $M_5$ there is only one short lozenge pillar 631.

In the radially intermediate array of the module M5, four lozenge pillars form a repeating group. The lozenge pillars of FIG. 8 are two-by-two equal and equally spaced one from the other. Particularly, a first medium lozenge pillar 621 is followed by two long lozenge pillars 622 and 623, which are, in turn, followed by a medium lozenge pillar 624.

Again, in the radially outer array of the module $M_5$ four teardrop pillars 610 follow one another. The teardrop pillars 610 of FIG. 8 are identical and equally spaced one from the other.

The short lozenge pillar 631 of the radially inner array extends from the inner circumference $C_i$ outwardly up to the proximity of a circumference $C_8$. The radially outer array pillars extend from the outer circumference $C_e$ inwardly up to the proximity of a circumference $C_9$. The medium lozenge pillars 621 and 624 of the intermediate array extend from the proximity of the circumference $C_9$ inwardly up to the proximity of the circumference $C_8$. The long lozenge pillars 622 and 623 of the intermediate array extend from the proximity of the circumference $C_9$ inwardly up to beyond the circumference $C_8$.

It shall be noted from FIG. 8 that the radial distances between inner $C_i$ and intermediate $C_8$, intermediate $C_8$ and intermediate $C_9$, intermediate $C_9$ and outer $C_e$ circumferences are essentially equal.

In accordance with the embodiment represented in FIG. 8, the teardrop pillars of the radially outer array and the lozenge pillars of the intermediate array of the module M5 are offset one from the other. In other terms, the inward extension of the median line L of a teardrop pillar 610 belonging to the radially outer array extends between two lozenge pillars a belonging to the intermediate array.

Furthermore, the short lozenge pillar of the radially inner array is offset relative to the lozenge pillars of the intermediate array, and it is aligned relative to a teardrop pillar of the radially outer array. In other terms, the outward extension of the short lozenge pillar 631 median line L perfectly overlaps the median line of a teardrop pillar 610 belonging to the radially outer array.

The module $M_5$ of the embodiment of FIG. 8 has a circumferential width of 36°. Consequently, the module $M_5$ repeats itself 10 times in the circumferential direction along the entire braking band 3.

The particular arrangements of the connecting members 33 described above allow achieving, in the brake disc 1 according to the invention, ventilation ducts 34 which allow an optimized venting and a maximally efficient dispersion of heat.

With reference to the FIGS. 6, 7, and 8, the dragging members 70 which are intended to constrain braking band 3 to support cap 2 and 8 will be described herein below. Such dragging members 70 are manufactured in an integral manner, and as a single piece with the braking band 3.

Particularly, FIG. 6 shows the dragging members 70 when raw, as they are released from the casting mould. FIG. 8 shows dragging members 70 similar to those in FIG. 6, but in a successive stage, after they have been processed at the tool machine. Finally, FIG. 7 shows dragging members 70 similar to those in the FIGS. 6 and 8, but in their final state, in which they are received in the special seat 27 which is obtained in the support cap 2 radial periphery.

It shall be noted in FIGS. 6, 7, and 8 that the dragging members 70 comprise a root 71 and a projection 72. The projection 72 is intended to be fitted in the special seat 27 which is obtained in the support cap 2. In accordance with an embodiment of the invention, the projection 72 is received inside the seat 27 so as to be constrained in the tangential direction and the axial direction, while it is free to slide in the radial direction. The projections 72, by abutting against the walls of the respective seats 27, are able to transmit the braking pair from band 3 to cap 2.

Instead, the roots 71 serve to anchor dragging member to braking band and to convey the braking forces exerted by friction on the two plates 31 and 32, so as to bring them to the projections 72, in order to subsequently transmit them to the cap 2.

The dragging members roots 71 according to the invention are of a particular shape which can be defined as "Y" or "T" shape, which is described in more detail below.

As it shall be noted in FIGS. 6, 7, and 8, the dragging members 70 comprise a widening in the circumferential direction of the section in the proximity of the roots 71, where they fit onto the braking band 3. Such widening allows combining the forces which are applied to the braking band 3 in a particularly efficient manner.

In accordance with an embodiment, the dragging members 70 comprise a widening in the axial direction of the section in the proximity of the roots 71, where they fit onto the braking band 3. Such widening allows fitting the dragging members on both the plates 31 and 32.

That the dragging members 70 fit on both the plates 31 and 32 affords a considerable structural advantage relative to other known solutions, in which the dragging members fit on only one plate. In fact, fitting on both the plates allows to the dragging members combining the stresses generated on the individual plate by the braking action, without the need to transmit such stresses from a plate to the other through the connecting members 33. In this manner, the connecting members 33, for example, tongues 40 or pillars 60, can be dimensioned, from a structural point of view, in order to resist only to the compressive force exerted by the caliper during the braking action. From a structural point of view, in the brake disc 1 according to the invention, no other transmission of forces is required to the connecting members 33.

Another criterion underlying the design of the connecting members 33, whether they are tongues 40 or pillars 60, is the definition of the brake disc 1 ventilation ducts 34.

From the fluid-dynamic point of view, it shall be appreciated how the particular configuration of the dragging members 70 allows letting free access to the circulation of air inside all the ventilation ducts 34. Particularly, the Y- or T-shaped trend of the roots 71, in the axial direction as well as the tangential direction, allows anchoring the dragging members 70 to the braking band in a structurally firm and efficient manner, while letting free access to the ventilation ducts 34 for the cooling air.

Such solution is preferred to other known solutions, in which the individual dragging member 70 extends until the same root thereof becomes a connecting member (pillar or tongue). In such type of known solution, in fact, the structural need and the fluid-dynamic needs come into conflict.

Particularly, in such known solution, the widening of the dragging member 70 root compromises the access of air to the ventilation duct, which is radially aligned to the same dragging member 70. On the contrary, in the same known solution, a dragging member 70 which does not provide any widening to the root compromises the efficient transmission of forces between braking band and dragging member 70.

Instead, the solution according to the invention allows, as regards the dragging members 70, advantageously separating the structural functions from the fluid-dynamic ones.

To the embodiments of the brake disc described above, those skilled in the art, in order to meet contingent needs, will be able to make modifications, adaptations, and replacements of members with others which are functionally equivalent, without departing from the scope of the following claims. Each of the characteristics described as belonging to a possible embodiment can be implemented independently from the other embodiments described.

The invention claimed is:

1. A brake disc comprising:
   a support cap, intended to be connected to a wheel hub of a vehicle;
   a braking band, intended to cooperate with a caliper of a disc brake, comprising two plates connected by a plurality of connecting members which define ventilation ducts;
   wherein all connecting members of the brake disk are included in the plurality of connecting members;
   wherein all of said connecting members having different shapes and/or dimensions are arranged according to a module which repeats an integral number of times along the braking band, and
   the connecting members are pillars having a relatively squat section;
   wherein
   each of said pillars defines a straight median line;
   said module consists of pillars arranged in three circumferential arrays including a radially inner array, a radially outer array, and a radially intermediate array, wherein
   the radially inner array consists of only one short lozenge pillar and
   the radially intermediate array consists of four lozenge pillars in the following order: a medium lozenge pillar, two long lozenge pillars, and a medium lozenge pillar.

2. The brake disc according to claim 1, wherein the radially outer array comprises four identical, equally spaced teardrop pillars.

3. The brake disc according to claim 1, wherein the braking band comprises dragging members which are manufactured in an integral manner, and as a single piece with the braking band wherein said dragging members have roots having a Y or T shape.

4. The brake disc according to claim 2, wherein
   the braking band has an inner circumference and an outer circumference;
   each short lozenge pillar extends from the inner circumference outwardly up to a first intermediate circumference (C8); the teardrop pillars extend from the outer circumference inwardly up to a second intermediate circumference (C9); and the medium lozenge pillars extend from the second intermediate circumference (C9) inwardly up to the first intermediate circumference (C8).

5. The brake disc according to claim 4, wherein the radial distances between the inner circumference and the first intermediate circumference C8); between the first intermediate circumference (C8) and the second intermediate circumference (C9); and between the second intermediate circumference (C9) and said outer circumference are substantially equal.

6. The brake disc according to claim 2, wherein the teardrop pillars of the outer array and the medium and long lozenge pillars of the intermediate array are offset one from the other; that is, in which the inward extension of the median line of a teardrop pillar inserts essentially halfway between two lozenge pillars belonging to the intermediate array.

7. The brake disc according to claim 2, wherein the short lozenge pillar is offset relative to the medium and long lozenge pillars of the intermediate array and it is aligned relative to a teardrop pillar of the radially outer array.

8. The brake disc according to claim 3, wherein the roots of the dragging members comprise a section widening in the circumferential direction.

9. The brake disc according to any claim 3, wherein the roots of the dragging members comprise a section widening in the axial direction.

* * * * *